United States Patent [19]

Valmir et al.

[11] Patent Number: 5,151,681
[45] Date of Patent: Sep. 29, 1992

[54] BRAKE WEAR INDICATING DEVICE

[75] Inventors: Francis Valmir, Argenteuil; Yves Mazon, Paris; Eric Schonenberger, Bois Colombes, all of France

[73] Assignee: General Motors France, Gennevilliers, France

[21] Appl. No.: 772,633

[22] Filed: Oct. 8, 1991

Related U.S. Application Data

[63] Continuation of Ser. No. 549,305, Jul. 9, 1990, abandoned.

[30] Foreign Application Priority Data

Aug. 25, 1989 [GB] United Kingdom ............... 8919343

[51] Int. Cl.⁵ .............................................. B60T 17/22
[52] U.S. Cl. ................................... 340/454; 188/1.11
[58] Field of Search .................... 340/454; 188/1.11; 116/208; 200/61.44

[56] References Cited

U.S. PATENT DOCUMENTS

| | | |
|---|---|---|
| 2,731,619 | 9/1954 | Fratus . |
| 3,553,643 | 9/1968 | Maras . |
| 4,016,533 | 4/1977 | Iskikawa et al. ............... 340/454 |
| 4,318,457 | 3/1982 | Dorsch et al. ............... 340/454 X |
| 4,869,350 | 9/1989 | Fargier et al. ............... 340/454 X |

FOREIGN PATENT DOCUMENTS

| | | |
|---|---|---|
| 1039854 | 1/1957 | Fed. Rep. of Germany . |
| 1680117 | 3/1968 | Fed. Rep. of Germany . |
| 1959983 | 11/1969 | Fed. Rep. of Germany . |
| 3230266 | 8/1982 | Fed. Rep. of Germany . |
| 1257006 | 1/1958 | France . |
| 2266056 | 3/1974 | France . |
| 1178524 | 6/1968 | United Kingdom . |
| 1360768 | 4/1973 | United Kingdom . |
| 2042109 | 1/1980 | United Kingdom . |
| 2194824 | 9/1987 | United Kingdom . |

Primary Examiner—Jin F. Ng
Assistant Examiner—Brian R. Tumm
Attorney, Agent, or Firm—Ernest E. Helms

[57] ABSTRACT

A brake wear indicating device (10) including an insulated electrical conductor (12) with an electrical connector (16) at one end (18) for electrical connection with a warning device and, an end cap (20) of electrically insulating material on the other end (22) of the electrical conductor. The electrically insulating material secures the brake wear indicating device of an aperture (24) in a backing plate (26) of a brake pad (28) or brake shoe with the other end of the electrical conductor passing through an aperture in the backing plate from an outer surface (30) thereof to protrude from an inner surface (32) thereof. The end cap includes an abutment edge (38) for engaging the outer surface of the backing plate, a cap portion (40) secured to the other end of the electrical conductor. The end cap also has a shoulder (42) for engaging the inner surface of the backing plate, and at least one resiliently flexible finger (44) positionable in, and extensible through, the aperture and having a lip (46) for making a latching engagement with the inner surface of the backing plate.

11 Claims, 3 Drawing Sheets

BRAKE WEAR INDICATING DEVICE

This is a continuation of application Ser. No. 07/549305 filed on Jul. 9, 1990, now abandoned.

FIELD OF THE INVENTION

This invention relates to a brake wear indicating device for monitoring the wear of the friction lining of a brake pad or brake shoe of a vehicle, and for activating a warning device when excessive wear occurs.

DISCLOSURE STATEMENT

Several types of brake wear indicating device are known. One such example is shown in GB Patent No. 1360768. In this known arrangement, an electrically insulating end piece is moulded or otherwise attached to the end of an insulated electrical conductor. The other end of the electrical conductor is connectable to any suitable form of warning device. The insulating end piece seals the exposed end of the electrical conductor and also defines two opposed shoulders for securing the brake wear indicating device in an aperture in a backing plate of a brake pad. In use, after the friction lining on the backing plate is worn down below a predetermined height, the brake rotor wears away part of the projecting end of the insulating end piece to make an electrical connection with the electrical conductor, and so activate the warning device. This particular arrangement has the disadvantages that, after installation, the brake wear indicating device cannot be removed from the backing plate without damaging the insulating end piece, and that the aperture in the backing plate has to be specially formed with a chamfer to allow insertion of the insulating end piece. Further, a special tool has to be used to insert the insulating end piece.

SUMMARY OF THE INVENTION

It is an object of the present invention to overcome the above mentioned disadvantages.

To this end, a brake wear indicating device in accordance with the present invention comprises an insulated electrical conductor; connecting means electrically connected to one end of the electrical conductor for electrical connection with a warning device; and an end cap of electrically insulating material on the other end of the electrical conductor for securing the brake wear indicating device in an aperture in a backing plate of a brake pad or brake shoe with the said other end of the electrical conductor passing through the aperture in the backing plate from an outer surface thereof to protrude from an inner surface thereof, the end cap comprising an abutment edge for engaging the outer surface of the backing plate, a cap portion secured at the said other end of the electrical conductor and having a shoulder for engaging the inner surface of the backing plate, and at least one resiliently flexible finger positionable in, and extensible through, the aperture and having a lip for making a latching engagement with the inner surface of the backing plate.

For the sake of clarity, the inner surface of the backing plate of the brake pad or brake shoe is hereby defined as that surface on which the friction lining of the brake pad or brake shoe is secured. The outer surface is on the opposite side of the backing plate to the inner surface.

Preferably, the brake wear indicating device comprises two resiliently flexible fingers.

The cap portion of the end cap preferably encapsulates and seals the other end of the electrical conductor.

Preferably, a plug member is insertable between the cap portion of the end cap and the or each resiliently flexible finger.

The end cap is preferably glued on to the electrical conductor.

Preferably, the connecting means is an electrical male terminal.

The present invention will now be described, by way of example, with reference to the accompanying drawings.

DETAILED DESCRIPTION OF THE DRAWINGS

Figure 1:
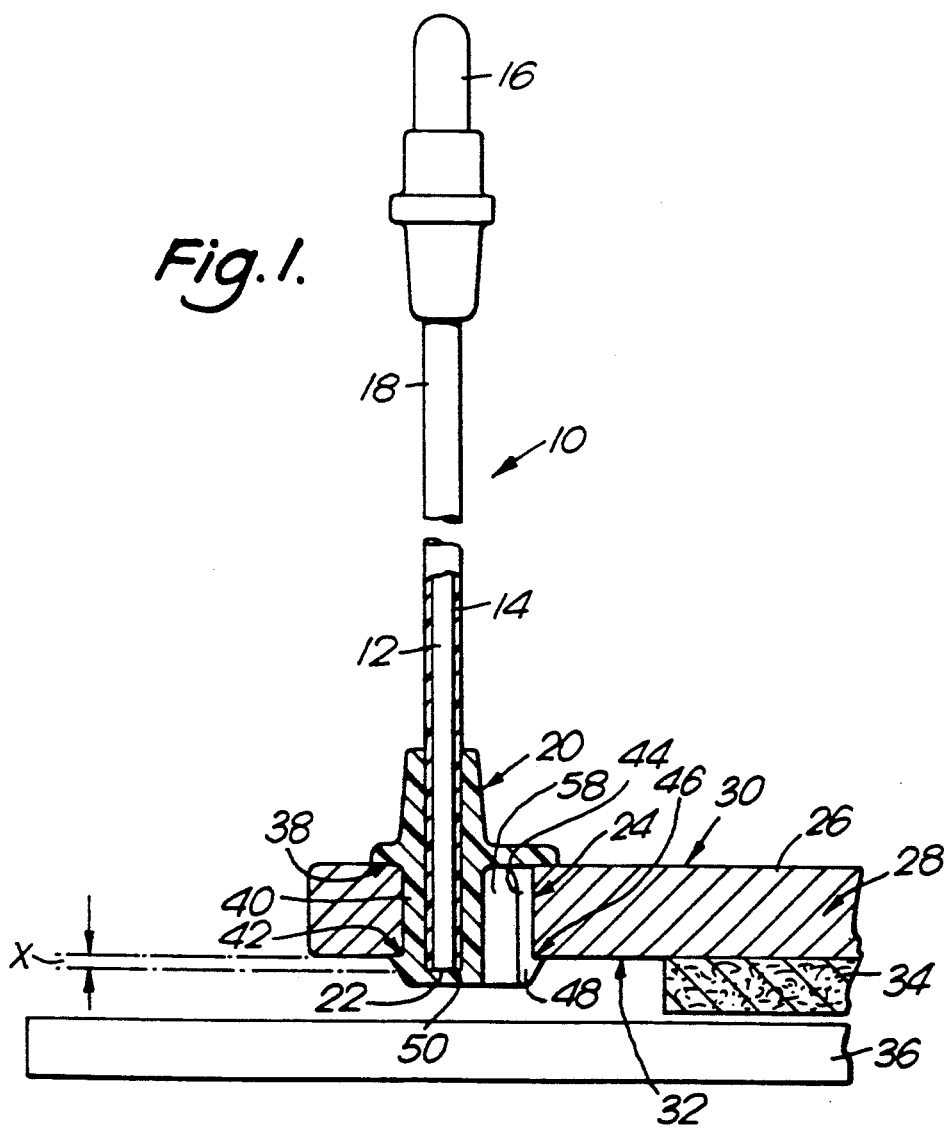
FIG. 1 is a side view (partially in cross-section) of a brake wear indicating device in accordance with a first embodiment of the present invention shown secured in position.
Figure 2:
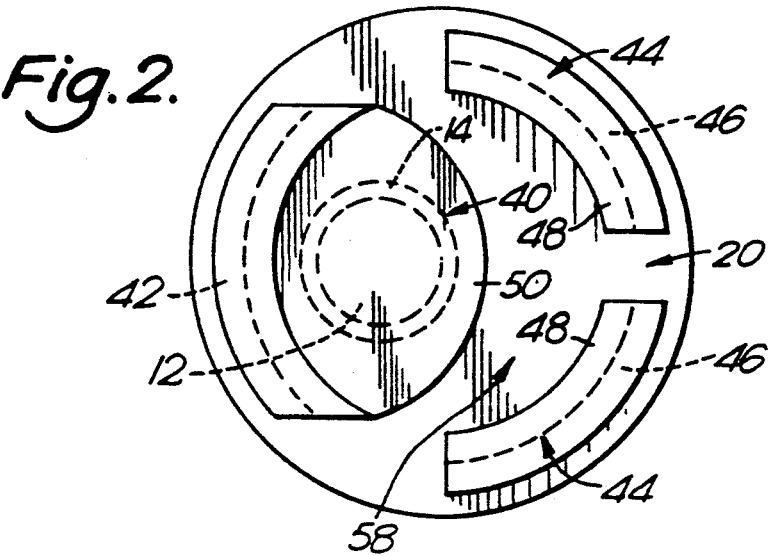
FIG. 2 is an end view of the end cap shown in FIG. 1.

Referring to FIGS. 1 and 2, a brake wear indicating device 10 is shown which comprises an electrical conductor 12 having a sheath 14 of electrically insulating material; connecting means in the form of a male terminal 16 electrically connected to one end 18 of the electrical conductor; and an end cap 20 of electrically insulating material at the other end 22 of the electrical conductor. The male terminal 16 is used to connect the brake wear indicating device 10 to a suitable warning device (not shown) and its associated circuitry (not shown) which are well known and will not be described in detail. In most instances, the warning device is usually in the form of a warning light.

The end cap 20 of the brake wear indicating device 10 is shown positioned in an aperture 24 in the backing plate 26 of a brake pad 28 of a disc brake of a motor vehicle. The backing plate 26 has an outer surface 30 and an inner surface 32. A layer 34 of friction lining material is secured to the inner surface 32. The disc brake also includes a brake rotor 36 which is engageable by the friction lining 34 on braking of the motor vehicle.

The end cap 20 comprises an abutment edge 38 in engagement with the outer surface 30 of the backing plate 26 along the periphery of the aperture 24, and a cap portion 40 which completely surrounds the other end 22 of the electrical conductor 12 to seal it from the surrounding environment mounting the conductor 12 eccentrically in the aperture 24. The cap portion 40 includes a shoulder 42 which engages the inner surface 32 of the backing plate 26 along the periphery of the aperture 24. The end cap 20 also includes two resiliently flexible fingers 44 which extend through the aperture 24 and which have lips 46 at the free ends 48 thereof making a latching engagement with the inner surface 32 of the backing plate 26. A special gap 58 is defined between the resiliently flexible fingers 44 and the cap portion 40.

The brake wear indicating device 10 is secured in position by passing the other end 22 of the electrical conductor 12 through the aperture 24 in the backing plate 26 from the outer surface 30 side thereof. On passing through the aperture 24, the free ends 48 of the resiliently flexible fingers 44 are pushed towards the cap portion 40 (to narrow the gap 58) until the abutment edge 38 engages the outer surface 30 of the backing plate 26, at which stage the resilience of the resiliently flexible fingers moves the shoulder 42 and the lips 46 into latching engagement with the inner surface 32 of the backing plate 26. The end cap 20 is therefore secured in position by making a snap fit in the aperture 24.

When secured in position, the other end 22 of the electrical conductor 12 protrudes a predetermined distance X above the inner surface 32 of the backing plate 26. On braking of the motor vehicle, the brake rotor 36 slowly wears away the friction lining 34 and eventually the brake rotor contacts, and wears away, the end 50 of the end cap 20. Once the height of the friction lining 34 falls to, or drops below, the predetermined distance X, the brake rotor 36 (which is electrically grounded) contacts the other end 22 of the electrical conductor 12 (on braking of the motor vehicle) to complete an electrical circuit and activate the warning device (not shown).

This invention has the advantage over the above mentioned prior art that only a simple straight aperture 24 is required in the backing plate 26, without the need for a chamfer. This considerably reduces the number of steps required to manufacture the backing plate 26, making it easier and cheaper to produce. Further, no special tools are required to insert the end cap 20 in the aperture 24, and the end cap can be removed from the aperture simply by moving the free ends 48 of the resiliently flexible fingers 44 back towards the cap portion 40 and then pulling the end cap out of the aperture. The latter feature has particular advantage in that the end cap 20 can be removed without damage. This allows the brake wear indicating device 10 to be reused if the end cap 20 has not been worn (for example, if the brake pads 28 are replaced on the motor vehicle production line, or are replaced before being fully worn). The brake wear indicating device 10 may be secured in position at any suitable time during assembly of the brake or during assembly of the motor vehicle.

In a preferred arrangement, the end cap 20 is of a material (such as polyphenylene sulphide, or a liquid crystal polymer, or polyether ether ketone) which can be glued to the sheath 14 of the electrical conductor 12. Alternatively, the end cap 20 may be moulded to the sheath of the electrical conductor 12.

Figure 3:
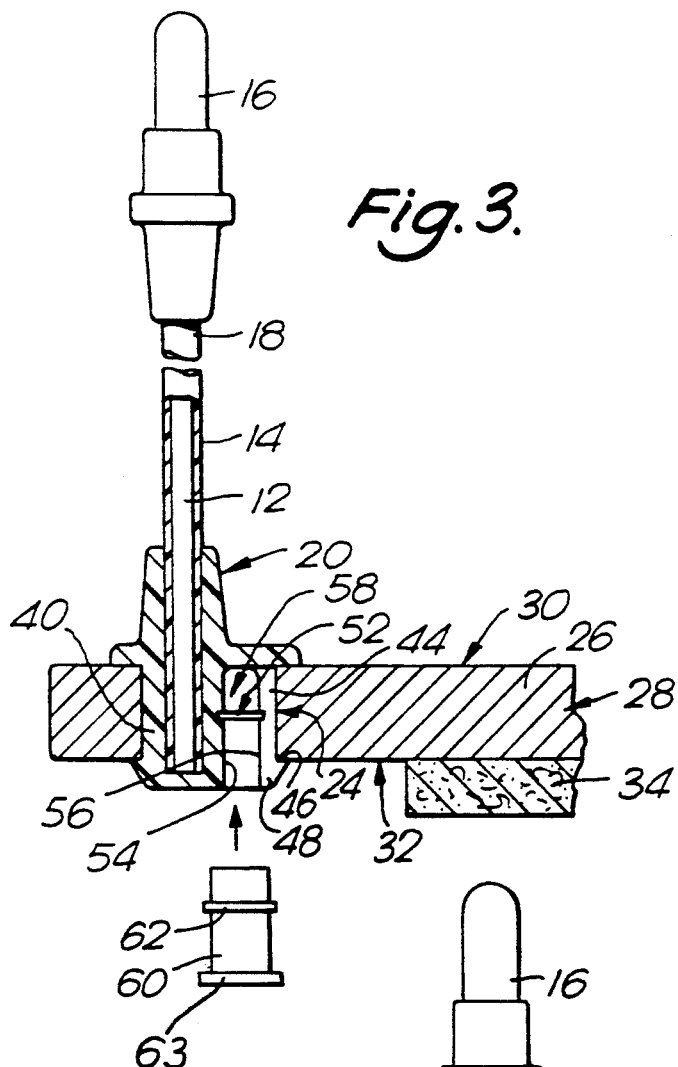
FIGS. 3 and 4 are side views (partially in cross-section) of a second embodiment of brake wear indicating device in accordance with the present invention.
Figure 4:
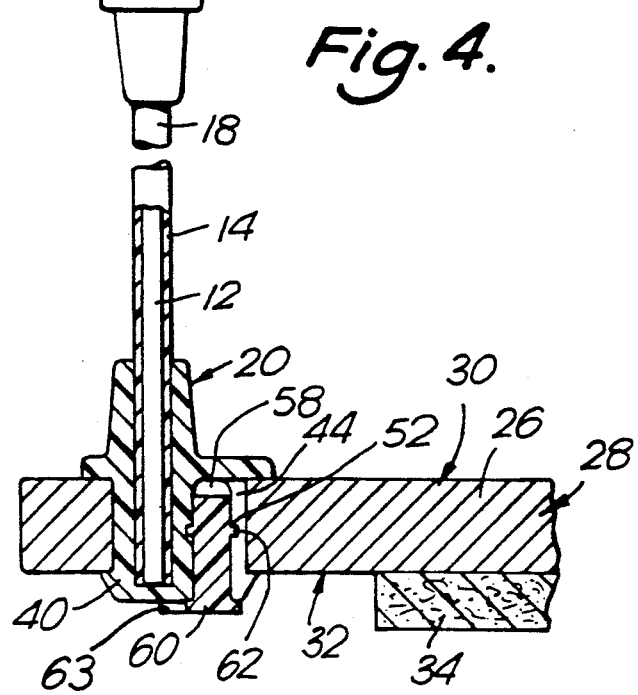

Referring now to FIGS. 3 and 4, a similar arrangement to that shown in FIGS. 1 and 2 is shown, and like parts have been given the same reference numeral. In this second embodiment, a groove 52 is formed in the inner surfaces 54,56 of the cap portion 40 and the resiliently flexible fingers 44 respectively, and extends circumferentially around the gap 58 therebetween. After insertion of the end cap 20 in the aperture 24, a plug member 60 is pushed into the gap 58. The plug member 60 has a circumferentially extending rib 62 which latches into the groove 52. This rib and groove interface connective arrangement ensures the end cap 20 remains in position in the aperture 24 whilst the brake indicating device 10 is in use. The plug member 60 may be made from any suitable plastics or metallic material. If the end cap 20 has to be removed from the aperture 24, the plug member 60 can be removed by inserting the extremity of a screwdriver (or any kind of small flat tool) under the shoulder 63 and pulling it out.

Figure 5:
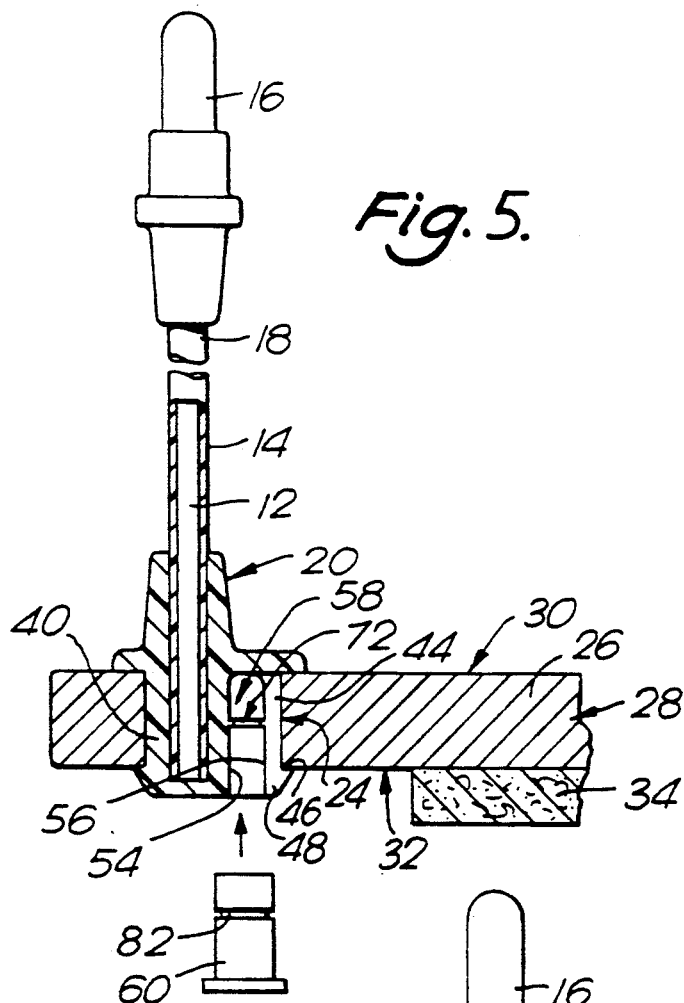
FIGS. 5 and 6 are side views (partially in cross-section) of a third embodiment of brake wear indicating device in accordance with the present invention.
Figure 6:
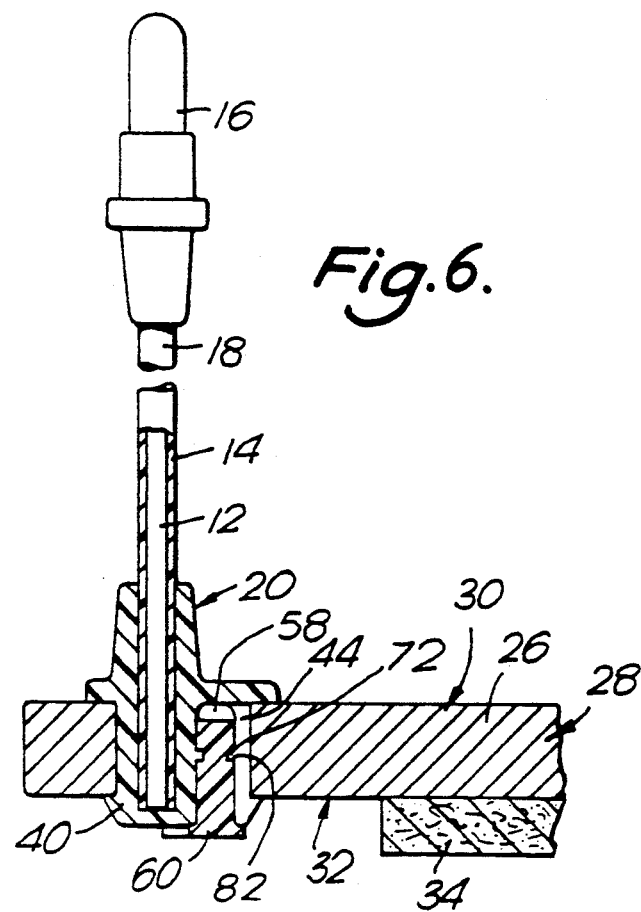

The third embodiment shown in FIGS. 5 and 6 is substantially identical to that shown in FIGS. 3 and 4, and like parts have been given the same reference numeral. In this case, the position of the rib and groove has been reversed. A groove 82 of the rib and groove interface connective arrangement circumferentially extends around the plug member 60, and makes a snap fit with a rib 72 formed on the inner surfaces 54, 56 of the cap portion 40 and the resiliently flexible fingers 44, respectively.

Whilst the above embodiments have been described in relation to their use with brake pads 28 of disc brakes, the present invention could also be used with brake shoes of drum brakes. Further, the connecting means has been shown as a male terminal 16, however any suitable electrical terminal or other electrical connecting device may be used as required. Further still, the above embodiments have been illustrated showing two resiliently flexible fingers 44, however any suitable number of resiliently flexible fingers may be used, even one. Still further, the cap portion 40 need not encapsulate and seal the other end 22 of the electrical conductor 12, but may simply be secured to the sheath 14 at the said other end 22.

We claim:

1. A brake wear indicating device comprising an insulated electrical conductor; connecting means electrically connected to one end of the electrical conductor for electrical connection with a warning device; and an end cap of electrically insulating material on the other end of the electrical conductor for securing the brake wear indicating device in an aperture in a backing plate of a brake pad or brake shoe with said other end of the electrical conductor passing through the aperture in the backing plate from an outer surface thereof to protrude from an inner surface thereof, and the end cap allowing the indicating device to be removed and later be resecured in the aperture of the backing plate, the end cap comprising an abutment edge for engaging the outer surface of the backing plate adjacent the periphery of the aperture, a cap portion secured to said other end of the electrical conductor and having a shoulder for engaging the inner surface of the backing plate adjacent the periphery of the aperture, the cap portion mounting the electrical conductor eccentrically within the aperture, and at least a first resiliently flexible finger positionable in and extensible through the aperture, and the finger within the aperture being separated from the cap portion within the aperture by a spacial gap between the finger and the cap portion, and the finger having a lip for making a latch engagement with the inner surface of the backing plate adjacent the periphery of the aperture and the brake wear indicating device including a plug member separated from the electrical conductor, the plug member being insertable in the spacial gap between the cap portion of the end cap and the at least one finger, the plug member having a rib for connection with a groove in the cap portion of the end cap.

2. A brake wear indicating device as claimed in claim 1, including at least a second resiliently flexible finger.

3. A brake wear indicating device as claimed in claim 1 wherein the cap portion of the end cap encapsulates and seals the other end of the electrical conductor.

4. A brake wear indicating device as claimed in claim 1 wherein the connecting means is an electrical male terminal.

5. A brake wear indicating device as claimed in claim 1 wherein the end cap is glued on to the electrical conductor.

6. A brake wear indicating device comprising an insulated electrical conductor; connecting means electrically connected to one end of the electrical conductor for electrical connection with a warning device; and an end cap of electrically insulating material on the other end of the electrical conductor for securing he brake wear indicating device in an aperture in a backing plate of a brake pad or brake shoe with said other end of the electrical conductor passing through the aperture in the backing plate from an outer surface thereof to protrude from an inner surface thereof, and the end cap allowing the indicating device to be removed and later be resecured in the aperture of the backing plate, the end cap comprising an abutment edge for engaging the outer surface of the backing plate adjacent the periphery of the aperture, a cap portion secured to said other end of the electrical conductor and having a shoulder for engaging the inner surface of the backing plate adjacent the periphery of the aperture, the cap portion mounting the electrical conductor eccentrically within the aperture, and at least a first resiliently flexible finger positionable in and extensible through the aperture, and the finger within the aperture being separated from the cap portion within the aperture by a spacial gap between the finger and the cap portion, and the finger having a lip for making a latch engagement with the inner surface of the backing plate adjacent the periphery of the aperture and the brake wear indicating device including a plug member separated from the electrical conductor, the plug member being insertable in the spacial gap between the cap portion of the end cap and the at least one finger, the plug member having a rib for connection with a groove in the finger.

7. A brake wear indicating device as claimed in claim 6 including at least a second resiliently flexible finger.

8. A brake wear indicating device comprising an insulated electrical conductor; connecting means electrically connected to one end of the electrical conductor for electrical connection with a warning device; and an end cap of electrically insulating material on the other end of the electrical conductor for securing he brake wear indicating device in an aperture in a backing plate of a brake pad or brake shoe with said other end of the electrical conductor passing through the aperture in the backing plate from an outer surface thereof to protrude from an inner surface thereof, and the end cap allowing the indicating device to be removed and later be resecured in the aperture of the backing plate, the end cap comprising an abutment edge for engaging the outer surface of the backing plate adjacent the periphery of the aperture, a cap portion secured to said other end of the electrical conductor and having a shoulder for engaging the inner surface of the backing plate adjacent the periphery of the aperture, the cap portion mounting the electrical conductor eccentrically within the aperture, and at least a first resiliently flexible finger positionable in and extensible through the aperture, and the finger within the aperture being separated from the cap portion within the aperture by a spacial gap between the finger and the cap portion, and the finger having a lip for making a latch engagement with the inner surface of the backing plate adjacent the periphery of the aperture and the brake wear indicating device including a plug member separated from the electrical conductor, the plug member being insertable in the spacial gap between the cap portion of the end cap and the at least one finger, the plug member having a groove for connection with a rib in the cap portion of the end cap.

9. A brake wear indicating device as claimed in claim 8, including at least a second resiliently flexible finger.

10. A brake wear indicating device comprising an insulated electrical conductor; connecting means electrically connected to one end of the electrical conductor for electrical connection with a warning device; and an end cap of electrically insulating material on the other end of the electrical conductor for securing he brake wear indicating device in an aperture in a backing plate of a brake pad or brake shoe with said other end of the electrical conductor passing through the aperture in the backing plate from an outer surface thereof to protrude from an inner surface thereof, and the end cap allowing the indicating device to be removed and later be resecured in the aperture of the backing plate, the end cap comprising an abutment edge for engaging the outer surface of the backing plate adjacent the periphery of the aperture, a cap portion secured to said other end of the electrical conductor and having a shoulder for engaging the inner surface of the backing plate adjacent the periphery of the aperture, the cap portion mounting the electrical conductor eccentrically within the aperture, and at least a first resiliently flexible finger positionable in and extensible through the aperture, and the finger within the aperture being separated from the cap portion within the aperture by a spacial gap between the finger and the cap portion, and the finger having a lip for making a latch engagement with the inner surface of the backing plate adjacent the periphery of the aperture and the brake wear indicating device including a plug member separated from the electrical conductor, the plug member being insertable in the spacial gap between the cap portion of the end cap and the at least one finger, the plug member having a groove for connection with a rib on the finger.

11. A brake wear indicting device as claimed in claim 10 including at least a second resiliently flexible finger.

* * * * *